United States Patent
Brewer et al.

(10) Patent No.: US 11,254,885 B2
(45) Date of Patent: *Feb. 22, 2022

(54) FUEL COMPOSITION

(71) Applicant: SHELL OIL COMPANY, Houston, TX (US)

(72) Inventors: Mark Lawrence Brewer, Rijswijk (NL); John Socrates Thomaides, Berkeley Height, NJ (US); John M Morales, Warren, NJ (US); Qiwei He, Belle Mead, NJ (US); Damien Christian Vadillo, Franklin, NJ (US); Michael Timothy Philbin, Hopewell, NJ (US); Joern Karl, Hamburg (DE); Nicholas James Rounthwaite, London (GB)

(73) Assignee: SHELL OIL COMPANY, Houston, TX (US)

( * ) Notice: Subject to any disclaimer, the term of this patent is extended or adjusted under 35 U.S.C. 154(b) by 749 days.

This patent is subject to a terminal disclaimer.

(21) Appl. No.: 16/074,791

(22) PCT Filed: Feb. 3, 2017

(86) PCT No.: PCT/EP2017/052436
§ 371 (c)(1),
(2) Date: Aug. 2, 2018

(87) PCT Pub. No.: WO2017/134251
PCT Pub. Date: Aug. 10, 2017

(65) Prior Publication Data
US 2021/0179957 A1  Jun. 17, 2021

(30) Foreign Application Priority Data

Feb. 5, 2016 (WO) ................ PCT/US2016/016693
Mar. 3, 2016 (EP) ..................... 16158570

(51) Int. Cl.
*C10L 1/196* (2006.01)
*C08F 220/18* (2006.01)
*C10L 10/12* (2006.01)
*C10L 10/14* (2006.01)

(52) U.S. Cl.
CPC ....... *C10L 1/1963* (2013.01); *C08F 220/1811* (2020.02); *C10L 10/12* (2013.01); *C10L 10/14* (2013.01); *C10L 2200/0446* (2013.01); *C10L 2270/026* (2013.01); *C10L 2290/24* (2013.01)

(58) Field of Classification Search
CPC ........ C10L 1/165; C10L 1/192; C10L 1/1963; C10L 10/00; C10L 2300/20; C10L 10/12; C10L 10/14; C10L 2200/0446; C10L 2270/026; C10L 2290/24; C10L 10/04; C10L 2230/22; C08F 220/1811
See application file for complete search history.

(56) References Cited

U.S. PATENT DOCUMENTS

| 4,124,551 A | 11/1978 | Mathai et al. |
| 4,208,190 A | 6/1980 | Malec |
| 4,529,656 A * | 7/1985 | Haigh .................... C08F 220/18 428/402 |
| 4,985,160 A * | 1/1991 | Henry .................. C10M 145/10 508/470 |
| 10,742,442 B2 * | 8/2020 | Teicher ............... H04L 12/2832 |
| 10,793,656 B2 * | 10/2020 | Thomaides ........... C08F 220/18 |
| 2009/0151235 A1 * | 6/2009 | Scanlon .................. C10L 10/14 44/338 |
| 2009/0241882 A1 | 10/2009 | Brunner et al. |
| 2011/0192076 A1 * | 8/2011 | Hess ....................... C10L 10/16 44/388 |
| 2012/0108679 A1 | 5/2012 | Findlay et al. |
| 2014/0259887 A1 * | 9/2014 | Kornfield ................ C10L 10/00 44/396 |
| 2016/0032200 A1 | 2/2016 | Garcia Castro et al. |

FOREIGN PATENT DOCUMENTS

| CN | 101410497 A | 4/2009 |
| CN | 102666812 A | 9/2012 |
| EP | 0147240 A2 | 7/1985 |
| EP | 0147873 A1 | 7/1985 |
| EP | 0482253 A1 | 4/1992 |
| EP | 0557516 A1 | 9/1993 |
| EP | 0583836 A1 | 2/1994 |
| EP | 0613938 A1 | 9/1994 |

(Continued)

OTHER PUBLICATIONS

Preparation of Poly(styrene-co-isobornyl methacrylate) Beads having Controlled Glass Transition Temperature by Suspension Polymerization Bing Zhang, Yuhong Ma Dong Chen Jingnan Xu and Wanti Yang J Appl. Polym Science (2013) 113-120) (Year: 2013).*
29. "Preparation of Polymer Microspheres in Supercritcal carbon dioxide and their evaluation as cold flow improvers in Diesel" Donghui Zhang, Leyu Cui Xinagpan Wei, Shubiao Zhang, Journal of Applied Polymer Science vol. 117, 2749-2753 (2010) (Year: 2010).*
International Search Report and Written Opinion received for PCT Patent Application No. PCT/EP2017/052436, dated Apr. 10, 2017, 10 pages.

(Continued)

*Primary Examiner* — Pamela H Weiss
(74) *Attorney, Agent, or Firm* — Shell Oil Company

(57) ABSTRACT

A fuel composition for powering a combustion engine, the composition comprising a liquid base fuel; and a (co) polymer obtainable by (co)polymerizing at least the following monomers: one or more bicyclic (meth)acrylate esters (a); up to 15 wt % of styrene (b); optionally other ethylenically unsaturated monomers that are not monomer (a) or (b); up to a total of 100 wt %, wherein the weight percentages of the monomer are based on the total weight of all of the monomers.

13 Claims, No Drawings

(56) References Cited

FOREIGN PATENT DOCUMENTS

| EP | 0626442 A1 | 11/1994 |
| GB | 960493 A | 6/1964 |
| GB | 1569344 A | 6/1980 |
| GB | 2077289 B | 6/1983 |
| WO | 9842808 A1 | 10/1998 |
| WO | 2016188839 A1 | 12/2016 |
| WO | 2016188837 A1 | 12/2016 |
| WO | 2016188850 A1 | 12/2016 |
| WO | 2016188858 A1 | 12/2016 |

OTHER PUBLICATIONS

Imoto et al., "Vinyl Polymerization. LXXIII. Polymerization and Copolymerization of Bornyl or Isobornyl Methacrylate", Journal of Polymer Science: Part A, vol. 2, Jan. 1, 1964, pp. 1407-1419, XP055269944.

Van Der Burgt et al., "The Shell Middle Distillate Synthesis Process", Nov. 1989, 8 pages.

Zhang et al., "Solution Characterization of Poly(Isobornyl Methacrylate) in Tetrahydrofuran", Journal of Polymer Science: Part B: Polymer Physics, vol. 32, Issue No. 11, Aug. 1994, pp. 1951-1956.

\* cited by examiner

FUEL COMPOSITION

CROSS REFERENCE TO RELATED APPLICATIONS

This is a national stage application of International Application No. PCT/EP2017/052436, filed 3 Feb. 2017, which claims benefit of priority to International Application No. PCT/US2016/016693, filed 5 Feb. 2016, and European Application No. 16158570.8, filed 3 Mar. 2016.

FIELD OF INVENTION

The present invention relates to fuel compositions containing a certain (co)polymer. Aspects of the invention also relate to the use of the (co)polymer in fuel compositions, and to the use of fuel compositions containing the (co)polymer.

BACKGROUND TO THE INVENTION

Polymers have previously been used for modifying the rheology of a fluid containing the polymer. There is a need for polymers that can be used to adjust the flow and spray characteristics of liquid fuels, such as gasoline and diesel fuels.

Liquid fuels must be vaporized and mixed with air, or oxygen, for effective combustion. As middle distillate or heavier fractions have low vapour pressures, efficient atomization is a particularly critical aspect of spray combustion of such fuels.

Atomization produces fine liquid fuel particles, whose large surface area leads to fast evaporation and thus rapid and efficient combustion. Even with efficient atomization stoichiometric combustion cannot be achieved. Limitation is imposed in this respect by the inability to reach a condition of perfect mixing in the time and size scale of the combustion process and equipment. In order to get complete combustion, therefore, it is necessary to supply excess air to the system.

Excess air, to the extent it provides complete combustion, serves to increase combustion efficiency. However, too much air can lead to a decrease in heat recovery. All of the oxygen not involved in the combustion process as well as all of the nitrogen in the air is heated and thus carries heat out of the stack. Further, the greater the excess air the greater the mass flow through the system and the shorter the time scale for heat transfer. Hence, achieving efficient combustion and heat recovery requires a delicate balance of atomization and excess air coupled with optimized combustion chamber and heat recovery system designs.

GB 1 569 344 relates to the use of polymers, especially poly-isobutylene, to modify fuel properties in an attempt to improve combustion efficiency. A problem with poly-isobutylene was found that it is very difficult to handle, which is exemplified by its glass transition temperature (Tg) of −75° C. Other known polymers such as poly-lauryl methacrylate also suffer from such a low Tg. Other polymers, such as poly isobornyl (meth)acrylates, were found to not give the desired rheological properties at acceptable costs and suffer from poor solubility.

Other polymers with higher Tg were found to suffer from insufficient solubility of the polymer in a fuel, as judged visually or via determination of cloud point, making them unsuitable for changing the fuel rheology.

There remains a need for alternative polymers with the ability of modifying the rheology of petroleum based fuels, that can be handled easily and have adequate solubility in the fuel, that can be used at lower dose rates in the fuel and that can enable improved combustion efficiency.

SUMMARY OF THE INVENTION

Therefore one object of the present invention is to provide a fuel composition comprising a polymer with the ability to modify the rheology of a base fuel of the composition in a manner that can positively influence combustion efficiency in an internal combustion engine run using the fuel.

The present inventors have found that this object can at least partly be met by a composition which will now be described in more detail.

In particular it has been unexpectedly found that fuel compositions comprising a (co)polymer comprising specific amounts of one or more bicyclic (meth)acrylate esters and specific amounts of styrene have advantageous fuel efficiency properties.

According to a first aspect of the present invention there is provided a fuel composition for powering a combustion engine, the composition comprising a liquid base fuel and a (co)polymer obtainable by (co)polymerizing the following monomers:
  one or more bicyclic (meth)acrylate esters (a), preferably at a level of more than 80 wt %;
  less than 20 wt %, preferably up to 15 wt %, of styrene (b);
  optionally other ethylenically unsaturated monomers that are not monomer (a) or (b);
  up to a total of 100 wt %, wherein the weight percentages of the monomer are based on the total weight of all of the monomers.

In the context of the invention the term '(meth)acrylate' indicates acrylate or methacrylate, and '(co)polymer' indicates polymer or copolymer. The term 'polymer' and the term 'copolymer' are also used herein interchangeably.

DETAILED DESCRIPTION OF THE INVENTION

For the polymers of the invention to be suitable for modifying the rheology of a base fuel containing the polymer, the polymer must be sufficiently soluble in said base fuel. Throughout this document sufficient solubility in a base fuel is determined by analyzing the cloud point of a 2% by weight solution of the polymer in a 80:20 petrodiesel:gas to liquid diesel fuel (v/v). Sufficient solubility is defined to be a cloud point of below 10° C. Preferably the cloud point is below 0° C. such that the polymers do not precipitate from the solution at temperatures around 0° C. Details on the cloud point determination that is used for this analysis is found in the experimental section below.

The bicyclic (meth)acrylate ester contains a (meth)acryloyl radical bonded to any carbon atom of the bicyclic rings, preferably of the six-membered carbon atom bridged ring; said esters include products such as decahydronaphthyl (meth)acrylates, and adamantyl (meth)acrylates. Preferred are products according to the general formula (I)

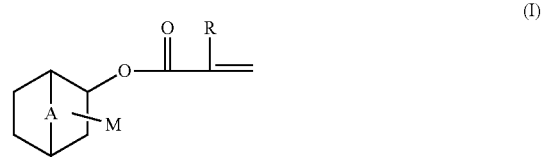

wherein

R is H or —CH$_3$,

A is —CH$_2$—, —CH(CH$_3$)$_n$— or —C(CH$_3$)$_2$—, and one or more M is covalently bonded to any carbon of the bicyclic rings, preferably to a carbon atom of the six-membered ring, and each M is independently selected from the group consisting of hydrogen, halogen, methyl, and methylamino or a plurality thereof.

Non-limiting examples of the bicyclic (meth)acrylate esters include isobornyl (meth)acrylate, bornyl (meth)acrylate, fenchyl (meth)acrylate, isofenchyl (meth)acrylate, norbornyl methacrylate, cis, (endo) 3-methylamino-2-bornyl (meth)acrylate, 1,4,5,6,7,7-hexachlorobicyclo [2.2.1]-hept-5-ene-2-ol methacrylate (HCBOMA) and 1,4,5,6,7,7-hexachlorobicyclo [2.2.1]-hept-5-ene-2 methanol methacrylate (HCBMA), and mixtures of such bicyclic methacrylates. The chlorinated compounds are less preferred since they can liberate corrosive HCl when burned. Preferably, the bicyclic methacrylate ester is isobornyl methacrylate. The bicyclic (meth)acrylate esters are known per se and may be prepared in known fashion or may be obtained from commercial sources.

The bicyclic (meth)acrylate is preferably chosen from monomers which, when polymerized, form a homopolymer that is soluble in a liquid fuel, more preferably in diesel fuel, such as 80:20 petrodiesel:gas to liquid diesel fuel.

The ethylenically unsaturated monomers which are optionally present include:

1) Fatty-alkyl (meth)acrylates, which are compounds wherein a (meth)acryloyl radical is bonded to a fatty alkyl group, herein defined as a C$_8$-C$_{24}$ alkyl group, preferably a C$_{10}$-C$_{22}$ group, which can be linear or branched, substituted or unsubstituted, saturated or unsaturated. Examples of the fatty alkyl (meth)acrylate include 2-ethylhexyl (meth)acrylate, decyl (meth)acrylate, isodecyl (meth)acrylate, lauryl (meth)acrylate, methacrylic ester 13.0 (CAS #: 90551-76-1), tetradecyl (meth)acrylate, hexadecyl (meth)acrylate, methacrylic ester 17.4 (CAS #: 90551-84-1), and stearyl (meth) acrylate. Preferred fatty-alkyl (meth)acrylates are chosen from monomers which, when polymerized, form a homopolymer which is soluble in diesel fuel. In another embodiment isodecyl (meth)acrylate, lauryl (meth)acrylate, methacrylic ester 13.0 (CAS #: 90551-76-1), methacrylic ester 17.4 (CAS #: 90551-84-1), and/or stearyl (meth)acrylate is used. In yet another embodiment, lauryl (meth)acrylate and/or methacrylic ester 13.0 (CAS #: 90551-76-1) is used. Suitably lauryl methacrylate is used;

2) Aromatic vinyl monomers other than styrene, that contain a vinyl group bonded to an aromatic group. Examples include substituted styrenes, vinyl naphthalene, divinylbenzene, and mixtures thereof. Preferred substituted styrenes include ortho-, meta- and/or para-alkyl, alkyloxy or halogen substituted styrenes, such as methyl styrene, 4-tert-butyl styrene, tert-butyloxy styrene, 2-chlorostyrene and 4-chlorostyrene. The aromatic vinyl monomer is preferably chosen from monomers which, when polymerized, form a homopolymer that is not soluble in a liquid fuel, preferably in diesel fuel, more preferably in 80:20 petrodiesel:gas to liquid diesel fuel;

3) Ethylenically unsaturated monomers different from the monomers in groups 1 and 2 defined above. Examples of such other monomers include lower alkyl (meth)acrylates, wherein lower alkyl denotes an alkyl group with less than 8 carbon atoms, such as methyl (meth)acrylate, ethyl (meth) acrylate, propyl (meth)acrylate, butyl (meth)acrylate, isobutyl (meth)acrylate, pentyl (meth)(acrylate) and hexyl (meth) acrylate, but also cationic, nonionic and anionic ethylenically unsaturated monomers, including, but not limited to, ethylenically unsaturated acids, such as (meth) acrylic acid, maleic acid, 2-acrylamido-2-methylpropane sulfonic acid, dimethylaminoethyl methacrylate, dimethylaminoethyl acrylate, N-[3-(dimethylamino) propyl] methacrylamide, N-[3-(dimethylamino) propyl] acrylamide, (3-acrylamidopropyl)-trimethyl-ammonium chloride, methacrylamido propyl trimethyl ammonium chloride, (meth) acrylamide, N-alkyl (meth)acrylamides, N-vinyl pyrrolidone, vinyl formamide, vinyl acetamide, and N-vinyl caprolactams.

In an embodiment of the invention, for any of the ethylenically unsaturated monomer that is optionally present, said monomer does not comprise chlorine or other elements, such as sulfur, which upon combustion result in corrosive products in exhaust systems, such as HCl and H$_2$SO$_4$ respectively.

In one embodiment the ethylenically unsaturated monomer that is used does not comprise elements that increase the emission of NOx compounds when said ethylenically unsaturated monomer is present in the fuel.

In yet another embodiment all the ethylenically unsaturated monomers are selected such that the resulting polymer, when used in a fuel and when said fuel is combusted, leads to a reduction in the emission of NOx compounds per kW produced by the engine burning said fuel.

In yet another embodiment all the ethylenically unsaturated monomers are selected such that the resulting polymer, when used in a fuel and when said fuel is combusted, leads to a reduction in the emission of particulate matter per kW produced by the engine burning said fuel (compared to burning the same fuel without the polymer).

The (co)polymer may be synthesized by conventional methods for vinyl addition polymerization known to those skilled in the art, such as, but not limited to, solution polymerization, precipitation polymerization, and dispersion polymerizations, including suspension polymerization and emulsion polymerization.

In an embodiment the polymer is formed by suspension polymerization, wherein monomers that are insoluble in water or poorly soluble in water are suspended as droplets in water. The monomer droplet suspension is maintained by mechanical agitation and the addition of stabilizers. Surface active polymers such as cellulose ethers, poly(vinyl alcohol-co-vinyl acetate), poly(vinyl pyrrolidone) and alkali metal salts of (meth)acrylic acid containing polymers and colloidal (water insoluble) inorganic powders such as tricalcium phosphate, hydroxyapatite, barium sulfate, kaolin, and magnesium silicates can be used as stabilizers. In addition, small amounts of surfactants such as sodium dodecylbenzene sulfonate can be used together with the stabilizer(s). Polymerization is initiated using an oil soluble initiator. Suitable initiators include peroxides such as benzoyl peroxide, peroxy esters such as tert-butylperoxy-2-ethylhexanoate, and azo compounds such as 2,2'-azobis(2-methylbutyronitrile). At the completion of the polymerization, solid polymer product can be separated from the reaction medium by filtration and washed with water, acid, base, or solvent to remove unreacted monomer or free stabilizer.

In another embodiment the polymer is formed by emulsion polymerization, wherein one or more monomers are dispersed in an aqueous phase and polymerization is initiated using a water soluble initiator. The monomers are typically water insoluble or very poorly soluble in water, and a surfactant or soap is used to stabilize the monomer droplets in the aqueous phase. Polymerization occurs in the swollen micelles and latex particles. Other ingredients that might be present in an emulsion polymerization include chain transfer agents such as mercaptans (e.g. dodecyl mercaptan) to control molecular weight, small amounts of water soluble organic solvents such as but not limited to acetone, 2-butanone, methanol, ethanol, and isopropanol, to adjust the polarity of the aqueous phase, and electrolytes to control pH. Suitable initiators include alkali metal or ammonium salts of persulfate such as ammonium persulfate, water-soluble azo compounds such as 2,2'-azobis(2-aminopropane)dihydrochloride, and redox systems such as Fe(II) and cumene hydroperoxide, and tert-butyl hydroperoxide-Fe(II)-sodium ascorbate. Suitable surfactants include anionic surfactants such as fatty acid soaps (e.g. sodium or potassium stearate), sulfates and sulfonates (e.g. sodium dodecyl benzene sulfonate), sulfosuccinates (e.g. dioctyl sodium sulfosuccinate); non-ionic surfactants such as octylphenol ethoxylates and linear and branched alcohol ethoxylates; cationic surfactants such as cetyl trimethyl ammonium chloride; and amphoteric surfactants. Anionic surfactants and combinations of anionic surfactants and non-ionic surfactants are most commonly used. Polymeric stabilizers such as poly(vinyl alcohol-co-vinyl acetate) can also be used as surfactants. The solid polymer product free of the aqueous medium can be obtained by a number of processes including destabilization/coagulation of the final emulsion followed by filtration, solvent precipitation of the polymer from latex, or spray drying of the latex.

One skilled in the art will recognize that certain surfactants and initiator systems could leave residues in the polymer that will be undesirable in the fuel. These might include sulfur containing species and halides, but also mono- and multivalent metals or their ions. One can either select alternative surfactants and initiators that will not leave such residues, or choose an isolation/purification process that will remove or minimize any unwanted residues.

In an embodiment, the copolymer is obtainable by copolymerizing the following monomers:
more than 80 wt % of one or more bicyclic (meth)acrylate esters,
less than 20 wt % of styrene, and optional further ethylenically unsaturated monomers.

Preferably, the copolymer is polymerized from:
60 to 99.95 wt %, preferably more than 80 to 99.95 wt %, of the bicyclic (meth)acrylate ester (a);
0.05 to 15 wt % of styrene (b); and
0 to 25 wt % of ethylenically unsaturated monomers that are not monomer (a) or (b).

Throughout this document, the weight percentages (wt %) of the monomer that constitute the (co)polymer, are based on the total weight of the monomers used, whereby the total weight of the monomers adds up to 100 wt %.

More preferably, the copolymer used in the invention is polymerized from:
63 to 99.95 wt %, preferably 65 to 99.95 wt %, more preferably 75 to 99.95 wt %, even more preferably 81 to 99.95 wt %, 82 to 99.95 wt %, 83 to 99.95 wt %, or 85 to 99.95 wt %, most preferably 90 to 99.95 wt %, of the bicyclic (meth)acrylate ester (a);
0.05 to 12 wt %, preferably 1 to 10 wt %, more preferably 2.5 to 8.0 wt % of styrene (b); and
0 to 25 wt %, preferably 0 to 20 wt %, more preferably 0 to 19 wt %, even more preferably 0 to 18 wt %, most preferably 0 to 15 wt %, of ethylenically unsaturated monomers not being a monomer (a) or (b).

Preferably in the copolymer used in the invention, and most suitably for each of the embodiments, the sum of monomer (a) and monomer (b) is greater than or equal to 80 wt %, more preferably greater than or equal to 83 wt %, even more preferably greater than or equal to 90 wt %; even even more preferably greater than or equal to 95 wt %, and most preferably greater than or equal to 99 wt % of the total monomer composition.

Preferably in the copolymer used in the invention, and most suitably for each of the embodiments, the amount of the other ethylenically unsaturated monomers not being a) or b) does not exceed 10 wt %, more preferably does not exceed 5 wt %, even more preferably does not exceed 1 wt %, and in certain embodiments, monomers a), and styrene together constitute 100 wt % of the monomers used to form the copolymer.

In a proviso, the copolymers used in the invention are not composed of at least one bicyclic (meth)acrylate ester, at least one fatty-alkyl (meth)acrylate, and at least one lower-alkyl (meth)acrylate. Also they may not be copolymers of at least one bicyclic (meth)acrylate ester, at least one fatty-alkyl (meth)acrylate, at least one lower-alkyl (meth)acrylate, and at least one aromatic vinyl monomer, particularly not copolymers wherein the weight percentage of bicyclic (meth)acrylate is more than 15 weight percentage higher than the amount of aromatic vinyl monomer. In an embodiment of this proviso the copolymers contain more than 20, preferably more than 10, more preferably more than 5 wt % of the fatty-alkyl (meth)acrylate. In another embodiment of this proviso the copolymers contain more than 20, preferably more than 10, more preferably more than 5 wt % of the lower-alkyl (meth)acrylate.

In another proviso, the copolymers used in this invention are not composed of at least one bicyclic (meth)acrylate ester, at least one fatty-alkyl (meth)acrylate, optionally at least one aromatic vinyl monomer, and optionally other ethylenically unsaturated monomers. In an embodiment of this proviso the copolymers are not composed of 20 to 95 wt % of the bicyclic (meth)acrylate ester, 5 to 80 wt %, preferably 5 to 40 wt %, of the fatty-alkyl (meth)acrylate, up to 65 wt % of aromatic vinyl monomer, and optionally other ethylenically unsaturated monomers. In an embodiment of this proviso the copolymers contain more than 20, preferably more than 10, more preferably more than 5 wt % of the fatty-alkyl (meth)acrylate. In another embodiment of this proviso the copolymers contain more than 20, preferably more than 10, more preferably more than 5 wt % of aromatic vinyl monomer. In another embodiment of this proviso the copolymers contain more than 20, preferably more than 10, more preferably more than 5 wt % of other ethylenically unsaturated monomers.

It was noted that although the homopolymers of styrene have a very high cloud point in 80:20 petrodiesel:gas to liquid diesel fuel (>150° C.), small amounts of these monomers can be copolymerized with isobornyl methacrylate to give highly soluble copolymers with a cloud point below 12.5° C. What is more, in a very specific concentration range for the styrene, the cloud point of the copolymer was found to be even lower than the cloud point of poly(isobornyl methacrylate) which has a cloud point of 0.5 to 3° C. In a preferred embodiment the copolymer has a cloud point which is lower than 0° C.

If so desired, particularly to control the molecular weight and the molecular weight distribution of the polymer and/or to control rheological behaviour of solutions of the polymer, small amounts of divinylbenzene can be used in the mix of monomers. Typically divinylbenzene levels are below 5 wt %, preferably below 2 wt %, more preferably below 1 wt %.

In the copolymer used in the invention, the monomers may be arranged in any fashion, such as in blocks or randomly. Preferably, the copolymer is a randomly arranged copolymer.

The weight averaged molecular weight (Mw) of the (co)polymer used in the invention, when measured in accordance with the method described in the experimental section, is preferably at least 100,000 Dalton (D) or 200,000 D, in an embodiment at least 250,000 D, in another embodiment at least 400,000 D. The upper molecular weight is determined by the solubility in the fuel in which it is intended to be used. A suitable Mw is 50,000,000 or less, preferably less than 25,000,000. Polymers with a composition defined for use in the invention and a molecular weight of 100,000 to 50,000,000, preferably 250,000 to 5,000,000 D were found to be useful at low concentrations, which made them particularly suitable for application in fuel, particularly for use in additive packages for fuel. The polydispersity index (PDI), i.e. Mw/Mn of the copolymer used in the invention is suitably in the range of from 1 to 10, preferably from 1 to 5. Therefore, in an embodiment, the Mn of the polymers of the invention is 20,000 D or more.

The glass transition temperature of the (co)polymer used in the invention is preferably in the range of from 50 to 220° C., more preferably from 65 to 210° C., and in another embodiment from 95 to 200° C., as determined by Differential Scanning Calorimetry (DSC). Herein the glass transition temperatures (Tg) were measured using a DSC Q200 (TA Instruments, New Castle, Del.) with the following program:
1) Start DSC run with isothermal of 15 min at 20 degree C.;
2) Ramp the temperature at 10 degree C./min to roughly 20 degree C. above the Tg of the material;
3) Run isothermal at that temperature for 5 min;
4) Ramp temperature down from 20 degree C. above Tg at 20 degree C./min to 20 degree C.;
5) Run isothermal at 20 degree C. for 5 min;
6) Start the Modulate mode with the process condition of +/−1.280 degree C. for every 60 second;
7) Ramp the temperature at 2 degree C./min to 180 degree C.

The composition of the polymer can be reliably estimated from the relative amounts of the monomers fed into the polymerization. Alternatively, the composition of the (co) polymer is suitably determined from carbon-13 NMR spectra using a Varian MR-400 MHz and/or an Agilent DD2 MR 500 MHz NMR spectrometer.

The polymer of the invention is advantageously added to a petroleum based fuel suitable for running combustion engines, such as fuels conventionally known as gasoline and diesel fuels. The polymer is preferably added to the fuel in an amount effective to obtain a combustion efficiency improving effect. Typically, the polymer used in the invention is added to the fuel to achieve concentrations below 10,000 ppm (parts per million by weight), such as from 5, from 10, from 50, from 100 or from 500 ppm, preferably up to 3000 or 5000 ppm. The term "ppm" equates to one mg per kg. In an embodiment, the copolymer is preferably present in a fuel composition in an amount in the range of from 10 ppm to 300 ppm, more preferably in the range of from 10 to 100, for example 25 ppm to 80 ppm, based on the total weight of the fuel composition.

The (co)polymers used in the present invention have the following advantages: (1) they are better suited to adjust the flow and spray characteristics of a petroleum based fuel than conventional polymers; (2) the cloud point of the (co) polymers is low enough to allow handling of the polymer at temperatures of 0° C.; (3) the cost of these (co)polymers will be lower than that of poly(isobornyl methacrylate) and other conventional polymers; and (4) they can be used in additive packages for use in fuel.

In an embodiment, the fuel composition of the invention comprises a copolymer component consisting of, or comprising, one or more copolymers obtainable by (co)polymerizing the following monomers:
one or more bicyclic (meth)acrylate esters (a);
up to 15 wt % of styrene (b);
optionally other ethylenically unsaturated monomers that are not monomer (a) or (b);
up to a total of 100 wt %, wherein the weight percentages of the monomer are based on the total weight of all of the monomers.

In an embodiment, the copolymer is preferably present in a fuel composition in amount in the range of from 10 ppm to 300 ppm, more preferably in the range of from 10 to 100, for example 25 ppm to 80 ppm, based on the total weight of the fuel composition.

Preferably, said copolymer component consists of one or more (co)polymers as defined above.

The term "consisting" wherever used herein also embraces "consisting substantially", but may optionally be limited to its strict meaning of "consisting entirely".

In the present application, in order to determine solubility of the (co)polymers in diesel, a 80:20 petrodiesel (B0):gas to liquid (GTL) diesel fuel (v/v), in accordance with the EN 590 diesel fuel specification is used. (B0 means that the diesel fuel contains 0% biofuel). This fuel is considered to be the most demanding fuel with respect to solubility of a polymer. Therefore a polymer which passes the solubility criterion in this fuel is considered to be useful for dissolution into any fuel.

The copolymer of the invention is preferably soluble in such 80:20 petrodiesel:gas to liquid diesel fuel (v/v). A copolymer used herein is considered to be soluble in fuel when at least a 2.0 wt % solution of the copolymer in the fuel at 25° C. can be made, if necessary after heating. Preferably a 2.0 wt % solution of the polymer in the fuel at 8° C. can be made. In another embodiment a 9.1 wt % solution of the polymer in the fuel at 25° C. can be made. Preferably the copolymers used herein, when analyzed as described below in the experimental section, show a cloud point below 10° C., more preferably a cloud point below 5° C., and even more preferably a cloud point below 0° C.

The copolymer component is to be understood herein as a component added to the base fuel. Preferably, the copolymer component may be, or be taken to be, the sole source of the copolymer(s) that it consists of in the composition, but this is not essential.

In some embodiments of the invention, the copolymer component may comprise a small amount of impurities, for example by-products of polymer synthesis that have no substantive effect on the overall properties of the copolymer component. Such impurities may, for example, be present in the copolymer component in an amount of at most about 3 wt %. In embodiments of the invention, such impurities up to 3 wt % may be considered part of the copolymer component, in which case the component consists substantially of the copolymer compounds.

The base fuel may be a liquid base fuel of any suitable type.

The base fuel may be at least partly fossil fuel derived, such as derived from petroleum, coal tar or natural gas.

The base fuel may be at least partly bioderived. Bio-derived components comprise at least about 0.1 dpm/gC of carbon-14. It is known in the art that carbon-14, which has a half-life of about 5700 years, is found in biologically derived materials but not in fossil fuels. Carbon-14 levels can be determined by measuring its decay process (disintegrations per minute per gram carbon or dpm/gC) through liquid scintillation counting.

The base fuel may be at least partly synthetic: for instance derived by a Fischer-Tropsch synthesis.

Conveniently, the base fuel may be derived in any known manner, e.g. from a straight-run stream, synthetically-produced aromatic hydrocarbon mixtures, thermally or catalytically cracked hydrocarbons, hydrocracked petroleum fractions, catalytically reformed hydrocarbons or mixtures of these.

In an embodiment, the base fuel is a distillate.

Typically, the base fuel may be a hydrocarbon base fuel, i.e. comprise, or consist of, hydrocarbons. However, the base fuel may also comprise or consist of oxygenates, for example alcohols or esters, as is known in the art.

The base fuel may itself comprise a mixture of two or more different components, and/or be additivated, e.g. as described below.

The copolymer in the fuel offers particular advantages in the context of middle distillate or heavier base fuels. In an embodiment, the base fuel comprises a middle distillate, for example a diesel and/or kerosene base fuel.

Preferably, the base fuel may be a diesel base fuel. The diesel base fuel may be any fuel component, or mixture thereof, which is suitable and/or adapted for use in a diesel fuel composition and therefore for combustion within a compression ignition (diesel) engine. It will typically be a middle distillate base fuel.

A diesel base fuel will typically boil in the range from 150 or 180 to 370 or 410° C. (ASTM D86 or EN ISO 3405), depending on grade and use.

The diesel base fuel may be derived in any suitable manner. It may be at least partly petroleum derived. It may be at least partly obtained by distillation of a desired range of fractions from a crude oil. It may be at least partly synthetic: for instance it may be at least partly the product of a Fischer-Tropsch condensation. It may be at least partly derived from a biological source.

A petroleum derived diesel base fuel will typically include one or more cracked products, obtained by splitting heavy hydrocarbons. A petroleum derived gas oil may for instance be obtained by refining and optionally (hydro)processing a crude petroleum source. The diesel base fuel may comprise a single gas oil stream obtained from such a refinery process or a blend of several gas oil fractions obtained in the refinery process via different processing routes. Examples of such gas oil fractions are straight run gas oil, vacuum gas oil, gas oil as obtained in a thermal cracking process, light and heavy cycle oils as obtained in a fluid catalytic cracking unit and gas oil as obtained from a hydrocracker unit. Optionally a petroleum derived gas oil may comprise some petroleum derived kerosene fraction.

Preferably such fractions contain components having carbon numbers in the range 5 to 40, more preferably 5 to 31, yet more preferably 6 to 25, most preferably 9 to 25, and such fractions preferably have a density at 15° C. of 650 to 1000 kg/m³, a kinematic viscosity at 20° C. of 1 to 80 mm²/s, and a boiling range of 150 to 410° C.

Such gas oils may be processed in a hydrodesulphurisation (HDS) unit so as to reduce their sulphur content to a level suitable for inclusion in a diesel fuel composition.

The diesel base fuel may comprise or consist of a Fischer-Tropsch derived diesel fuel component, typically a Fischer-Tropsch derived gas oil.

In the context of the present invention, the term "Fischer-Tropsch derived" means that a material is, or derives from, a synthesis product of a Fischer-Tropsch condensation process. The term "non-Fischer-Tropsch derived" may be interpreted accordingly. A Fischer-Tropsch derived fuel or fuel component will therefore be a hydrocarbon stream in which a substantial portion, except for added hydrogen, is derived directly or indirectly from a Fischer-Tropsch condensation process.

Fischer-Tropsch fuels may for example be derived from natural gas, natural gas liquids, petroleum or shale oil, petroleum or shale oil processing residues, coal or biomass.

The Fischer Tropsch reaction converts carbon monoxide and hydrogen into longer chain, usually paraffinic, hydrocarbons:

$$n(CO+2H_2)=(-CH_2-)_n+nH_2O+\text{heat},$$

in the presence of an appropriate catalyst and typically at elevated temperatures (e.g. 125 to 300° C., preferably 175 to 250° C.) and/or pressures (e.g. 0.5 to 10 MPa, preferably 1.2 to 5 MPa). Hydrogen:carbon monoxide ratios other than 2:1 may be employed if desired.

The carbon monoxide and hydrogen may themselves be derived from organic, inorganic, natural or synthetic sources, typically either from natural gas or from organically derived methane.

A Fischer-Tropsch derived diesel base fuel of use in the present invention may be obtained directly from the refining or the Fischer-Tropsch reaction, or indirectly for instance by fractionation or hydrotreating of the refining or synthesis product to give a fractionated or hydrotreated product. Hydrotreatment can involve hydrocracking to adjust the boiling range (see e.g. GB B 2077289 and EP-A-0147873) and/or hydroisomerisation which can improve cold flow properties by increasing the proportion of branched paraffins.

Typical catalysts for the Fischer-Tropsch synthesis of paraffinic hydrocarbons comprise, as the catalytically active component, a metal from Group VIII of the periodic table of the elements, in particular ruthenium, iron, cobalt or nickel. Suitable such catalysts are described for instance in EP-A-0583836.

An example of a Fischer-Tropsch based process is the Shell™ "Gas-to-liquids" or "GtL" technology (formerly known as the SMDS (Shell Middle Distillate Synthesis) and described in "The Shell Middle Distillate Synthesis Process", van der Burgt et al, paper delivered at the 5th Synfuels Worldwide Symposium, Washington D.C., November 1985, and in the November 1989 publication of the same title from Shell International Petroleum Company Ltd, London, UK). This process produces middle distillate range products by conversion of a natural gas into a heavy long chain hydrocarbon (paraffin) wax which can then be hydroconverted and fractionated.

For use in the present invention, a Fischer-Tropsch derived fuel component is preferably any suitable component derived from a gas to liquid synthesis (hereinafter a GtL component), or a component derived from an analogous Fischer-Tropsch synthesis, for instance converting gas, biomass or coal to liquid (hereinafter an XtL component). A Fischer-Tropsch derived component is preferably a GtL component. It may be a BtL (biomass to liquid) component. In general a suitable XtL component may be a middle distillate fuel component, for instance selected from kerosene, diesel and gas oil fractions as known in the art; such components may be generically classed as synthetic process fuels or synthetic process oils. Preferably an XtL component for use as a diesel fuel component is a gas oil.

The diesel base fuel may comprise or consist of a bio-derived fuel component (biofuel component). Such fuel components may have boiling points within the normal diesel boiling range, and will have been derived—whether directly or indirectly—from biological sources.

It is known to include fatty acid alkyl esters (FAMEs), in particular fatty acid methyl esters (FAMEs), in diesel fuel compositions. An example of an FAAE included in diesel fuels is rapeseed methyl ester (RME). FAMEs are typically derivable from biological sources and may be added for a variety of reasons, including to reduce the environmental impact of the fuel production and consumption process or to improve lubricity. The FAAE will typically be added to the fuel composition as a blend (i.e. a physical mixture), conveniently before the composition is introduced into an internal combustion engine or other system which is to be run on the composition. Other fuel components and/or fuel additives may also be incorporated into the composition, either before or after addition of the FAAE and either before or during use of the composition in a combustion system. The amount of FAAE added will depend on the natures of any other base fuels and FAAE in question and on the target Cloud Point.

FAMEs, of which the most commonly used in the present context are the methyl esters, are already known as renewable diesel fuels (so-called "biodiesel" fuels). They contain long chain carboxylic acid molecules (generally from 10 to 22 carbon atoms long), each having an alcohol molecule attached to one end. Organically derived oils such as vegetable oils (including recycled vegetable oils) and animal fats (including fish oils) can be subjected to a transesterification process with an alcohol (typically a $C_1$ to $C_5$ alcohol) to form the corresponding fatty esters, typically monoalkylated. This process, which is suitably either acid- or base-catalysed, such as with the base KOH, converts the triglycerides contained in the oils into fatty acid esters and free glycerol, by separating the fatty acid components of the oils from their glycerol backbone. FAAEs can also be prepared from used cooking oils, and can be prepared by standard esterification from fatty acids.

In the present invention, the FAAE may be any alkylated fatty acid or mixture of fatty acids. Its fatty acid component(s) are preferably derived from a biological source, more preferably a vegetable source. They may be saturated or unsaturated; if the latter, they may have one or more, preferably up to 6, double bonds. They may be linear or branched, cyclic or polycyclic. Suitably they will have from 6 to 30, preferably 10 to 30, more suitably from 10 to 22 or from 12 to 24 or from 16 to 18, carbon atoms including the acid group(s) —$CO_2H$.

The FAAE will typically comprise a mixture of different fatty acid esters of different chain lengths, depending on its source.

The FAAE is preferably derived from a natural fatty oil, for instance tall oil. The FAAE is preferably a $C_1$ to $C_5$ alkyl ester, more preferably a methyl, ethyl, propyl (suitably iso-propyl) or butyl ester, yet more preferably a methyl or ethyl ester and in particular a methyl ester. It may suitably be the methyl ester of tall oil. In general it may be either natural or synthetic, refined or unrefined ("crude").

The FAAE may contain impurities or by-products as a result of the manufacturing process.

The FAAE suitably complies with specifications applying to the rest of the fuel composition, and/or to another base fuel to which it is added, bearing in mind the intended use to which the composition is to be put (for example, in which geographical area and at what time of year). In particular, the FAAE preferably has a flash point (IP 34) of greater than 101° C.; a kinematic viscosity at 40° C. (IP 71) of 1.9 to 6.0 mm$^2$/s, preferably 3.5 to 5.0 mm$^2$/s; a density from 845 to 910 kg/m$^3$, preferably from 860 to 900 kg/m$^3$, at 15° C. (IP 365, EN ISO 12185 or EN ISO 3675); a water content (IP 386) of less than 500 ppm; a T95 (the temperature at which 95% of the fuel has evaporated, measured according to IP 123) of less than 360° C.; an acid number (IP 139) of less than 0.8 mgKOH/g, preferably less than 0.5 mgKOH/g; and an iodine number (IP 84) of less than 125, preferably less than 120 or less than 115, grams of iodine (I2) per 100 G of fuel. It also preferably contains (e.g. by gas chromatography (GC)) less than 0.2% w/w of free methanol, less than 0.02% w/w of free glycerol and greater than 96.5% w/w esters. In general it may be preferred for the FAAE to conform to the European specification EN 14214 for fatty acid methyl esters for use as diesel fuels.

Two or more FAAEs may be present in the base fuel of the present invention.

Preferably, the fatty acid alkyl ester concentration in the base fuel or total fuel composition accords with one or more of the following parameters: (i) at least 1% v; (ii) at least 2% v; (iii) at least 3% v; (iv) at least 4% v; (v) at least 5% v; (vi) up to 6% v; (vii) up to 8% v; (viii) up to 10% v, (xi) up to 12% v, (x) up to 35% v, with ranges having features (i) and (x), (ii) and (ix), (iii) and (viii), (iv) and (vii), and (v) and (vi) respectively being progressively more preferred. The range having features (v) and (viii) is also preferred.

The diesel base fuel may suitably comply with applicable current standard diesel fuel specification(s) as set out below for the diesel fuel composition.

The fuel composition of the present invention may in particular be a diesel fuel composition. It may be used in, and/or may be suitable and/or adapted and/or intended for use in, any type of compression ignition (diesel) engine. It may in particular be an automotive fuel composition.

The diesel fuel composition may comprise standard diesel fuel components. It may include a major proportion of a diesel base fuel, for instance of the type described above. A "major proportion" means typically 85% w/w or greater based on the overall composition, more suitably 90 or 95% w/w or greater, most preferably 98 or 99 or 99.5% w/w or greater.

In a diesel fuel composition according to the invention, the base fuel may itself comprise a mixture of two or more diesel fuel components of the types described above.

The fuel composition may suitably comply with applicable current standard diesel fuel specification(s) such as for example EN 590 (for Europe) or ASTM D975 (for the USA). By way of example, the overall composition may have a density from 820 to 845 kg/m$^3$ at 15° C. (ASTM D4052 or EN ISO 3675); a T95 boiling point (ASTM D86 or EN ISO 3405) of 360° C. or less; a measured cetane number (ASTM D613) of 40 or greater, ideally of 51 or greater; a kinematic viscosity at 40° C. (VK40) (ASTM D445 or EN ISO 3104) from 2 to 4.5 centistokes (mm$^2$/s); a flash point (ASTM D93 or EN ISO 2719) of 55° C. or greater; a sulphur content (ASTM D2622 or EN ISO 20846) of 50 mg/kg or less; a cloud point (ASTM D2500/IP 219/ISO 3015) of less than −10° C.; and/or a polycyclic aromatic hydrocarbons (PAH) content (EN 12916) of less than 11% w/w. It may have a lubricity, measured using a high frequency reciprocating rig for example according to ISO 12156 and expressed as a "HFRR wear scar", of 460 μm or less.

Relevant specifications may however differ from country to country and from year to year, and may depend on the intended use of the composition. Moreover the composition may contain individual fuel components with properties outside of these ranges, since the properties of an overall blend may differ, often significantly, from those of its individual constituents.

A diesel fuel composition prepared according to the invention suitably contains no more than 5000 ppm (parts per million by weight) of sulphur, typically from 2000 to 5000 ppm, or from 1000 to 2000 ppm, or alternatively up to 1000 ppm. The composition may for example be a low or ultra-low sulphur fuel, or a sulphur free fuel, for instance containing at most 500 ppm, preferably no more than 350 ppm, most preferably no more than 100 or 50 or even 10 ppm, of sulphur.

A fuel composition according to the invention, or a base fuel used in such a composition, may be additivated (additive-containing) or unadditivated (additive-free). If additivated, e.g. at the refinery, it will contain minor amounts of one or more additives selected for example from cetane boost additives, anti-static agents, pipeline drag reducers, flow improvers (e.g. ethylene/vinyl acetate copolymers or acrylate/maleic anhydride copolymers), lubricity additives, antioxidants and wax anti-settling agents. Thus, the composition may contain a minor proportion (preferably 1% w/w or less, more preferably 0.5% w/w (5000 ppm) or less and most preferably 0.2% w/w (2000 ppm) or less), of one or more fuel additives, in addition to the copolymer.

The composition may for example contain a detergent. Detergent-containing diesel fuel additives are known and commercially available. Such additives may be added to diesel fuels at levels intended to reduce, remove or slow the build-up of engine deposits. Examples of detergents suitable for use in fuel additives for the present purpose include polyolefin substituted succinimides or succinamides of polyamines, for instance polyisobutylene succinimides or polyisobutylene amine succinamides, aliphatic amines, Mannich bases or amines and polyolefin (e.g. polyisobutylene) maleic anhydrides. Succinimide dispersant additives are described for example in GB-A-960493, EP-A-0147240, EP-A-0482253, EP-A-0613938, EP-A-0557516 and WO-A-98/42808. Particularly preferred are polyolefin substituted succinimides such as polyisobutylene succinimides.

A fuel additive mixture useable in a fuel composition prepared according to the invention may contain other components in addition to the detergent. Examples are lubricity enhancers; dehazers, e.g. alkoxylated phenol formaldehyde polymers; anti-foaming agents (e.g. polyether-modified polysiloxanes); ignition improvers (cetane improvers) (e.g. 2-ethylhexyl nitrate (EHN), cyclohexyl nitrate, di-tert-butyl peroxide and those disclosed in U.S. Pat. No. 4,208,190 at column 2, line 27 to column 3, line 21); anti-rust agents (e.g. a propane-1,2-diol semi-ester of tetrapropenyl succinic acid, or polyhydric alcohol esters of a succinic acid derivative, the succinic acid derivative having on at least one of its alpha-carbon atoms an unsubstituted or substituted aliphatic hydrocarbon group containing from 20 to 500 carbon atoms, e.g. the pentaerythritol diester of polyisobutylene-substituted succinic acid); corrosion inhibitors; reodorants; anti-wear additives; anti-oxidants (e.g. phenolics such as 2,6-di-tert-butylphenol, or phenylenediamines such as N,N'-di-sec-butyl-p-phenylenediamine); metal deactivators; combustion improvers; static dissipator additives; cold flow improvers; and wax anti-settling agents.

Such a fuel additive mixture may contain a lubricity enhancer, especially when the fuel composition has a low (e.g. 500 ppm or less) sulphur content. In the additivated fuel composition, the lubricity enhancer is conveniently present at a concentration of less than 1000 ppm, preferably between 50 and 1000 ppm, more preferably between 70 and 1000 ppm. Suitable commercially available lubricity enhancers include ester- and acid-based additives.

It may also be preferred for the fuel composition to contain an anti-foaming agent, more preferably in combination with an anti-rust agent and/or a corrosion inhibitor and/or a lubricity enhancing additive.

Unless otherwise stated, the (active matter) concentration of each such additive component in the additivated fuel composition is preferably up to 10000 ppm, more preferably in the range of 0.1 to 1000 ppm, advantageously from 0.1 to 300 ppm, such as from 0.1 to 150 ppm.

The (active matter) concentration of any dehazer in the fuel composition will preferably be in the range from 0.1 to 20 ppm, more preferably from 1 to 15 ppm, still more preferably from 1 to 10 ppm, advantageously from 1 to 5 ppm. The (active matter) concentration of any ignition improver present will preferably be 2600 ppm or less, more preferably 2000 ppm or less, conveniently from 300 to 1500 ppm. The (active matter) concentration of any detergent in the fuel composition will preferably be in the range from 5 to 1500 ppm, more preferably from 10 to 750 ppm, most preferably from 20 to 500 ppm.

If desired one or more additive components, such as those listed above, may be co-mixed—preferably together with suitable diluent(s)—in an additive concentrate, and the additive concentrate may then be dispersed into a base fuel or fuel composition. The copolymer may, in accordance with the present invention, be incorporated into such an additive formulation.

In the diesel fuel composition, the fuel additive mixture will for example contain a detergent, optionally together with other components as described above, and a diesel fuel-compatible diluent, which may be a mineral oil, a solvent such as those sold by Shell companies under the trade mark "SHELLSOL", a polar solvent such as an ester and, in particular, an alcohol, e.g. hexanol, 2-ethylhexanol, decanol, isotridecanol and alcohol mixtures such as those sold by Shell companies under the trade mark "LINEVOL", especially LINEVOL 79 alcohol which is a mixture of $C_7$-$C_9$ primary alcohols, or a $C_{12}$-$C_{14}$ alcohol mixture which is commercially available.

The total content of the additives in the fuel composition may be suitably between 0 and 10000 ppm and preferably below 5000 ppm.

In this specification, amounts (concentrations, % v/v, ppm, % w/w) of components are of active matter, i.e. exclusive of volatile solvents/diluent materials.

The present invention may be used to give performance benefits similar to an increased cetane number of the fuel composition. The invention may additionally or alternatively be used to adjust any property of the fuel composition which is equivalent to or associated with cetane number, for example to improve the combustion performance of the composition (e.g. to shorten ignition delays, to facilitate cold starting and/or to reduce incomplete combustion and/or associated emissions in a fuel-consuming system running on the fuel composition) and/or to improve combustion noise, and/or to improve power.

In principle, the base fuel may also comprise or consist of a type of liquid base fuel other than a diesel base fuel.

Suitably, the base fuel may comprise or consists of a heavy distillate fuel oil. In an embodiment, the base fuel comprises an industrial gas oil or a domestic heating oil.

Suitably, the base fuel may comprise or consist of a kerosene base fuel, a gasoline base fuel or mixtures thereof.

Kerosene base fuels will typically have boiling points within the usual kerosene range of 130 to 300° C., depending on grade and use. They will typically have a density from 775 to 840 kg/m³, preferably from 780 to 830 kg/m³, at 15° C. (e.g. ASTM D4502 or IP 365). They will typically have an initial boiling point in the range 130 to 160° C. and a final boiling point in the range 220 to 300° C. Their kinematic viscosity at −20° C. (ASTM D445) might suitably be from 1.2 to 8.0 mm²/s.

A gasoline base fuel may be any fuel component, or mixture thereof, which is suitable and/or adapted for use in a gasoline fuel composition and therefore for combustion within a spark ignition (petrol) engine.

Typically, the gasoline base fuel is a liquid hydrocarbon distillate fuel component, or mixture of such components, containing hydrocarbons which boil in the range from 0 to 250° C. (ASTM D86 or EN ISO 3405) or from 20 or 25 to 200 or 230° C. The optimal boiling ranges and distillation curves for such base fuels will typically vary according to the conditions of their intended use, for example the climate, the season and any applicable local regulatory standards or consumer preferences.

The gasoline base fuel may be derived from, for example, petroleum, coal tar, natural gas or wood, in particular petroleum. It may be synthetic: for instance it may be the product of a Fischer-Tropsch synthesis.

A gasoline base fuel will typically have a research octane number (RON) (ASTM D2699 or EN 25164) of 80 or greater, or of 85 or 90 or 93 or 94 or 95 or 98 or greater, for example from 80 to 110 or from 85 to 115 or from 90 to 105 or from 93 to 102 or from 94 to 100. It will typically have a motor octane number (MON) (ASTM D2700 or EN 25163) of 70 or greater, or of 75 or 80 or 84 or 85 or greater, for example from 70 to 110 or from 75 to 105 or from 84 to 95.

A gasoline base fuel suitably has a low or ultra low sulphur content, for instance at most 1000 ppm (parts per million by weight) of sulphur, or no more than 500 ppm, or no more than 100 ppm, or no more than 50 or even 10 ppm. It also suitably has a low total lead content, such as at most 0.005 g/l; in an embodiment it is lead free ("unleaded"), i.e. having no lead compounds in it.

A gasoline base fuel might typically have a density from 0.720 to 0.775 kg/m³ at 15° C. (ASTM D4052 or EN ISO 3675). For use in a summer grade gasoline fuel, a base fuel might typically have a vapour pressure at 37.8° C. (DVPE) of from 45 to 70 kPa or from 45 to 60 kPa (EN 13016-1 or ASTM D4953-06). For use in a winter grade fuel it might typically have a DVPE of from 50 to 100 kPa, for example from 50 to 80 kPa or from 60 to 90 kPa or from 65 to 95 kPa or from 70 to 100 kPa.

The gasoline base fuel may comprise or consist of one or more biofuel components, which are derived from biological sources. For example, it may comprise one or more oxygenates as additional fuel components, in particular alcohols or ethers having boiling points below 210° C. Examples of suitable alcohols include $C_1$ to $C_4$ or $C_1$ to $C_3$ aliphatic alcohols, in particular ethanol. Suitable ethers include $C_5$ or $C_{5+}$ ethers. The base fuel may include one or more gasoline fuel additives, of the type which are well known in the art.

It may be a reformulated gasoline base fuel, for example one which has been reformulated so as to accommodate the addition of an oxygenate such as ethanol.

In an embodiment, the fuel composition of the present invention is a gasoline fuel composition.

The gasoline fuel composition can be suitable and/or adapted for use in a spark ignition (petrol) internal combustion engine. It may in particular be an automotive fuel composition.

It may for example include a major proportion of a gasoline base fuel as described above. A "major proportion" in this context means typically 85% w/w or greater based on the overall fuel composition, more suitably 90 or 95% w/w or greater, most preferably 98 or 99 or 99.5% w/w or greater.

The gasoline fuel composition may suitably comply with applicable current standard gasoline fuel specification(s) such as for example EN 228 in the European Union. By way of example, the overall formulation may have a density from 0.720 to 0.775 kg/m³ at 15° C. (ASTM D4052 or EN ISO 3675); a final boiling point (ASTM D86 or EN ISO 3405) of 210° C. or less; a RON (ASTM D2699) of 95.0 or greater; a MON (ASTM D2700) of 85.0 or greater; an olefinic hydrocarbon content of from 0 to 20% v/v (ASTM D1319); and/or an oxygen content of from 0 to 5% w/w (EN 1601).

Relevant specifications may however differ from country to country and from year to year, and may depend on the intended use of the composition. Moreover the composition may contain individual fuel components with properties outside of these ranges, since the properties of an overall blend may differ, often significantly, from those of its individual constituents.

The fuel composition may be prepared by simple blending of its components in any suitable order. From a second aspect, the invention provides a method of blending the fuel composition, the method comprising blending the copolymer with the base fuel. The method may comprise agitating the composition to disperse or dissolve the copolymer in the base oil.

In embodiments, the present invention may be used to produce at least 1,000 litres of the (co)polymer-containing fuel composition, or at least 5,000 or 10,000 or 20,000 or 50,000 litres.

According to a third aspect of the invention, there is provided the use of the (co)polymer in the fuel composition for the purpose of one or more of:

(i) aiding atomisation of the fuel composition;
(ii) decreasing the ignition delay of the composition; and
(iii) improving the power output of a combustion ignition engine run on the composition.

In the context of the present invention, "use" of the (co)polymer in a fuel composition means incorporating the (co)polymer into the composition, typically as a blend (i.e. a physical mixture) with one or more other fuel components, for example a base fuel and optionally one or more fuel additives, preferably a diesel base fuel and optionally one or more diesel fuel additives. The (co)polymer will conveniently be incorporated before the composition is introduced into an engine or other system which is to be run on the composition. Instead or in addition, the use of the (co)polymer may involve running a fuel-consuming system, typically an internal combustion engine, on a fuel composition containing the (co)polymer, typically by introducing the composition into a combustion chamber of an engine. It may involve running a vehicle which is driven by a fuel-consuming system, on a fuel composition containing the (co)polymer. In such cases the fuel composition is suitably a diesel fuel composition and the engine is suitably a compression ignition (diesel) engine. "Use" of the (co) polymer in the ways described above may also embrace supplying the (co)polymer together with instructions for its use in a fuel composition, in particular a diesel fuel composition. The (co)polymer may itself be supplied as part of a composition which is suitable for and/or intended for use as a fuel additive.

A fourth aspect of the invention provides for the use of a fuel composition according to the first aspect of the invention for the purpose of one or more of:
(i) aiding fuel atomisation;
(ii) decreasing ignition delay; and
(iii) improving the power output of a combustion ignition engine run on the composition.

The combustion engine is preferably an internal combustion engine, and more preferably the fuel composition is a diesel fuel composition and the combustion engine is compression ignition (diesel) engine.

The purposes of aiding, decreasing and improving may in particular be achieved relative to a fuel composition substantially free from said (co)polymer.

A fuel composition prepared or used according to the invention may be marketed with an indication that it benefits from an improvement, for example a decrease in ignition delay, and/or an improvement in power. The marketing of such a composition may comprise an activity selected from (a) providing the composition in a container that comprises the relevant indication; (b) supplying the composition with product literature that comprises the indication; (c) providing the indication in a publication or sign (for example at the point of sale) that describes the composition; and (d) providing the indication in a commercial which is aired for instance on the radio, television or internet. The improvement may optionally be attributed, in such an indication, at least partly to the presence of the (co)polymer. The use of the composition may involve assessing the relevant property (for example the ignition delay, and/or the power output) derived from the composition during or after its preparation. It may involve assessing the relevant property both before and after incorporation of the (co)polymer, for example so as to confirm that the (co)polymer contributes to the relevant improvement in the composition.

Throughout the description and claims of this specification, the words "comprise" and "contain" and variations of the words, for example "comprising" and "comprises", mean "including but not limited to", and do not exclude other moieties, additives, components, integers or steps. Moreover the singular encompasses the plural unless the context otherwise requires: in particular, where the indefinite article is used, the specification is to be understood as contemplating plurality as well as singularity, unless the context requires otherwise.

Preferred features of each aspect of the invention may be as described in connection with any of the other aspects. Other features of the invention will become apparent from the following examples. Generally speaking the invention extends to any novel one, or any novel combination, of the features disclosed in this specification (including any accompanying claims and drawings). Thus features, integers, characteristics, compounds, chemical moieties or groups described in conjunction with a particular aspect, embodiment or example of the invention are to be understood to be applicable to any other aspect, embodiment or example described herein unless incompatible therewith. For example, for the avoidance of doubt, the optional and preferred features of the fuel composition, the base fuel or the (co)polymer apply to all aspects of the invention in which the fuel composition, the base fuel or the (co)polymer are mentioned.

Moreover unless stated otherwise, any feature disclosed herein may be replaced by an alternative feature serving the same or a similar purpose.

Where upper and lower limits are quoted for a property, for example for the concentration of a fuel component, then a range of values defined by a combination of any of the upper limits with any of the lower limits may also be implied.

In this specification, references to fuel and fuel component properties are—unless stated otherwise—to properties measured under ambient conditions, i.e. at atmospheric pressure and at a temperature from 16 to 22 or 25° C., or from 18 to 22 or 25° C., for example about 20° C.

The present invention will now be further described with reference to the following non-limiting examples.

It should be appreciated that the various aspects and embodiments of the detailed description as disclosed herein are illustrative of the specific ways to make and use the invention and do not limit the scope of invention when taken into consideration with the claims and the detailed description. It will also be appreciated that features from different aspects and embodiments of the invention may be combined with features from different aspects and embodiments of the invention.

EXAMPLES

A series of exemplary (co)polymers (Synthesis Examples S5, S6, S7, S8, S9, S10, S11, S12, S13, S14 and S15) and comparative polymers (Comparative Examples CE1, CE2, CE3 and CE4) were made using different combinations of isobornyl methacrylate and styrene. Isobornyl methacrylate was obtained from Sigma-Aldrich or Evonik (VISIOMER® terra IBOMA). Styrene and polystyrene (Mw of 280,000) were obtained from Sigma-Aldrich.

Molecular Weight:

The molecular weight of the polymers was determined by GPC-MALS.
  Column: Phenogel Guard 10^6A
  Column Oven: 40° C.
  Mobile phase: Tetrahydrofuran
  Detection: Wyatt Dawn Heleos 18 angle MALS 633 nm and
  Wyatt Optilab T-REX Refractive Index Detector Cloud Point Determination Method—all Polymers Except Polystyrene To a 40 mL clear vial were charged 0.40 g polymer and 19.6 g 80:20 petrodiesel:gas to liquid diesel fuel (v/v). The vial was loosely capped and the mixture was stirred using a magnetic stir bar and stirrer for 1 h at ambient temperature (about 20 to 25° C.). The mixture was then heated to about 70-80° C. with stirring until a homogeneous solution was obtained. After the solution had cooled to ambient temperature, the cap was removed and a thermometer was introduced to the vial. While stirring with the thermometer, the solution was cooled by immersing the vial in a dry ice/isopropanol bath. The reported cloud point is the temperature at which the solution became visibly turbid or cloudy. As a check, once the cloud point of a polymer was determined, the clear polymer solution was chilled using the dry ice/isopropanol bath below the initially observed cloud point, and then the turbid solution was allowed to warm up past the point at which the solution became clear again while being stirred with a thermometer. The cloud point was judged to be confirmed if the temperature at which the clear polymer solution became cloudy and the temperature at which the cloudy polymer solution became clear were within 1° C. of each other (preferably, within 0.5° C.). For polymers with cloud points below 10° C., care was taken to exclude moisture from the polymer solutions while they were chilled; this was conveniently done by using parafilm to create a crude, flexible cover for the vial through which the thermometer was inserted.

Cloud Point Determination Method—Poly(Styrene)

To a 4-neck 500 mL round bottom flask equipped with an overhead mechanical stirrer, thermometer, condenser and septum/stopper was charged 1.3317 g of poly(styrene) and 65.65 g of 80:20 petrodiesel:gas to liquid diesel fuel (v/v). The resulting mixture was heated to 150° C. with stirring for a total of 3 h. After 3 h at 150° C., the polystyrene had not completely dissolved in this fuel. Based on this observation, the cloud point of polystyrene in the 80:20 petrodiesel:gas to liquid diesel fuel (v/v) fuel was estimated to be greater than 150° C.

Synthesis Examples S5-S15

Preparation of copolymers by emulsion polymerization process.

Materials:

| Initial Charge: | |
| --- | --- |
| Deionized water | 310.50 g |
| Aerosol ® OT-75 PG (sodium dioctyl sulfosuccinate, 75% in propylene glycol and water; available from Cytec) | 5.46 g |
| 1% NaOH | As needed |
| Co-solvent: Acetone | 70.0 g |
| Monomer total: | 150.0 g |
| Isobornyl methacrylate: Styrene | See Table 1 |
| Oxidant solution | |
| t-Butyl hydroperoxide, 70% (TBHP) | 0.0266 g |
| Deionized water | 2.50 g |
| Reductant solution | |
| Deionized water | 3.75 g |
| Sodium ascorbate | 0.036 g |
| Iron (II) sulfate heptahydrate, 0.25% in deionized water | 0.30 g |

Polymerization Procedure

A 1 L, 4-neck round bottom flask was equipped with an overhead mechanical stirrer; a Y-tube equipped with a nitrogen purge outlet-topped condenser and a thermometer and two septa. To the flask was charged deionized water and Aerosol OT-75 PG. Using a thermostatted water bath, the reaction temperature was brought to about 50° C. An 11 minute sub-surface nitrogen purge was then initiated via a needle inserted through one of the septa while maintaining a 200 rpm agitation rate.

While maintaining the nitrogen purge, a mixture of isobornyl methacrylate and styrene, and acetone were charged to the reaction vessel. The sub-surface nitrogen purge was continued after the monomer/acetone addition.

In a separate container, a reductant solution consisting of sodium ascorbate and iron(II) sulfate heptahydrate dissolved in deionized water was prepared. The iron(II) sulfate heptahydrate was added after the ascorbate had dissolved and just before use of the reductant solution.

The reaction was purged with nitrogen for an additional 15 minutes after the monomer/acetone addition, and then the resulting dark blue ascorbate solution was added via syringe to the reaction vessel in one shot while maintaining the sub-surface nitrogen purge.

In a second separate container, an oxidant solution consisting of t-butyl hydroperoxide (70%) in deionized water was prepared. About 12 minutes after the addition of the reductant, the oxidant solution was added to the reaction via syringe in one shot while maintaining the sub-surface nitrogen purge.

Within about 6 minutes, the onset of an exotherm was noted, and the sub-surface nitrogen purging was stopped in favour of above surface nitrogen purging. As the reaction progressed, a bluish tint was noted in the emulsion, and it became increasingly more translucent, and a slight increase in viscosity was noted. The reaction temperature reached a maximum of about 55° C. (initial temp: 49.7° C.) before it began to subside after about 30 min. The reaction temperature was maintained thereafter at 48-50° C. using the water bath. After a total of 4.5 hours reaction time, the reaction was cooled and poured through cheesecloth into a container.

Solid polymer was isolated by adding the undiluted emulsion polymer to a large excess of methanol. The resulting precipitate was collected by vacuum filtration and washed extensively with methanol.

The MW of the polymer product of Synthesis Example S7 was measured by conventional GPC-MALS and found to be Mn: 1,700,000; Mw: 3,150,000; PDI: 1.91, and the composition of the polymer product when analysed by NMR was found to be 90.5 wt % isobornyl methacrylate; 9.5 wt % styrene. Solids content (measured gravimetrically—duplicate runs) was 26.99%.

For the polymer products of Synthesis Examples S9, S10, S11 and S12 the amount of TBHP used was reduced to 0.0195 g. For Synthesis Examples S13, S14 and S15, 0.039 g TBHP and 0.072 g sodium ascorbate was used. In Synthesis Examples S10, S12, S14 and S15 no co-solvent was used. In Synthesis Examples 511, S12 and S14 the amount of sodium dioctyl sulfosuccinate was 2.055 g.

The compositions and properties of the Comparative polymers CE1-CE4 and those of Synthesis Examples S5-S15 are summarized in the Table 1 below.

TABLE 1

| Example | P# | IBXMA Wt % | Styrene Wt % | Cloud Point in 80:20 fuel at 2% (° C.) | Mw (kD) | Mn (kD) |
| --- | --- | --- | --- | --- | --- | --- |
| CE1 | P41 | 100 | 0 | +0.5 to 3 | 3,200 | 1,800 |
| CE2 | | 0 | 100 | >150 | NA | |
| CE3 | P46 | 67.5 | 32.5 | 45 | 2,670 | 1,250 |
| CE4 | | 80 | 20 | 21 | NA | |
| S5 | | 85 | 15 | 12 | NA | |
| S6 | | 88.5 | 11.5 | 3 | NA | |
| S7 | P73 | 92 | 8 | −4 | 3,150 | 1,700 |
| S8 | P75A | 95 | 5 | −4 | 4,900 | 3,100 |
| S9 | P75B | 95 | 5 | −4 | 4,400 | 2,400 |
| S10 | P75C | 95 | 5 | −4* | 5,650 | 3,850 |
| S11 | P75D | 95 | 5 | −4* | 4,550 | 3,100 |
| S12 | P75E | 95 | 5 | −4* | 3,650 | NA |
| S13 | P75F | 95 | 5 | −4* | 3,850 | NA |
| S14 | P75G | 95 | 5 | −4* | 3,800 | 2,200 |
| S15 | P75H | 95 | 5 | −4* | 2,950 | 1,650 |

IBXMA = isobornyl methacrylate
NA = not analysed
*= expected, not determined

The copolymers S5-S15 have a surprisingly low cloud point allowing their use in fuel compositions over a wide temperature range.

Diesel Engine Testing

The fuel blends shown in Table 2 were prepared for bench engine testing.

TABLE 2

| | Fuel blend composition | | |
|---|---|---|---|
| Example | Fuel/Fuel blend # | Copolymer # | Amount of copolymer (ppm) |
| Diesel Base Fuel | B5 diesel base fuel (5% biodiesel) + 2000 ppm Shellsol A150 | none | 0 |
| Fuel Composition 1 | B5 diesel base fuel + 2000 ppm Shellsol A150 + copolymer | S7 (P73) | 84 |
| Fuel Composition 2 | B5 diesel base fuel + 2000 ppm Shellsol A150 + copolymer | S7 (P73) | 120 |

Fuel composition 1 was prepared by adding 84 ppm of the copolymer prepared in Synthesis Example S7 (P73) to 2000 ppm of Shellsol A150 ® (a $C_9$-$C_{10}$ aromatic hydrocarbon solvent commercially available from Shell Chemicals), and then dissolving the resulting mixture in B5 diesel base fuel to yield a fuel composition having the desired mg/kg concentration. Fuel composition 2 was prepared by adding 120 ppm of the copolymer prepared in Synthesis Example S7 (P73) to 2000 ppm of Shellsol A150 ®, and then dissolving the resulting mixture in B5 diesel base fuel to yield a fuel composition having the desired mg/kg concentration. The amount of copolymer present is indicated in ppm based on the total weight of the fuel composition. The diesel base fuel (B5) used to prepare the fuel blends had the specification given in Table 3 below.

The two additivated fuel compositions and the diesel base fuel itself were subjected to engine testing in a VW TDI Common Rail bench engine under steady state conditions. The engine was held at 2000 rpm at 100% accelerator pedal position (APP), providing testing at maximum torque and maximum power conditions. The engine specification is shown in Table 4 below. Parameters such as torque and peak cylinder pressure were measured for each of the additivated fuels as well as the diesel base fuel (RF-06-08 reference fuel) shown in Table 3.

TABLE 3

Specification of B5 Diesel Base Fuel (RF-06-08)

| Parameter | Method | Unit | Minimum Specification Limits | Maximum Specification Limits | Result |
|---|---|---|---|---|---|
| Cetane Number (CFR) | EN ISO 5156 | — | 52.0 | 54.0 | 53.9 |
| Density at 15° C. | EN ISO 3675 | kg/m$^3$ | 833.0 | 837.0 | 833.9 |
| Distillation IBP | EN ISO 3405 | ° C. | — | — | 204.5 |
| Distillation 50% v/v | EN ISO 3405 | ° C. | 245.0 | — | 285.3 |
| Distillation 95% v/v | EN ISO 3405 | ° C. | 345.0 | 350.0 | 347.7 |
| Distillation FBP | EN ISO 3405 | ° C. | — | 370.0 | 362.8 |
| Flash Point | EN ISO 2719 | ° C. | 55 | — | 91 |
| CFPP | EN 116 | ° C. | — | −5 | −20 |
| Viscosity at 40° C. | EN ISO 3104 | mm$^2$/s | 2.300 | 3.300 | 3.191 |
| Aromatics, Poly (2 + 3) | EN 12916 | % wt | 2.0 | 6.0 | 3.7 |
| Aromatics, Total | EN 12916 | % wt | — | — | 19.2 |
| Aromatics, Mono | EN 12916 | % wt | — | — | 15.5 |
| Aromatics, Di | EN 12916 | % wt | — | — | 3.6 |
| Aromatics, Tri+ | EN 12916 | % wt | — | — | <0.1 |
| Sulfur | EN ISO 20846 | mg/kg | — | 10.0 | <3.0 |
| Corrosion - Copper | EN ISO 2160 | | — | 1 | 1A |
| Carbon Residue 10% Distillation Residue | EN ISO 10370 | % wt | — | 0.20 | <0.10 |
| Ash Content | EN ISO 6245 | % wt | — | 0.010 | <0.001 |
| Water | EN ISO 12937 | mg/kg | — | 200 | 28 |
| Strong Acid Number | ASTM D974 | mg KOH/g | — | 0.02 | <0.01 |
| Oxidation Stability | EN ISO 12205 | g/m$^3$ | — | 25 | 1.1 |
| Oxidation Stability | EN 15751 | h | 20.0 | — | 33.3 |
| HFRR (wsd 1,4) | EN ISO 12156-1 | μm | — | 400 | 195 |
| FAME | EN 14078 | % vol | 4.5 | 5.5 | 5.0 |
| Oxygen Content calculated | EN 14078 | % wt | — | — | 0.64 |
| Carbon | ASTM D3343 | % wt | — | — | 85.83 |
| Hydrogen | ASTM D3343 | % wt | — | — | 13.54 |
| C:H Ratio (H = 1) | ASTM D3343 | — | — | — | 6.34 |
| H:C Ratio (C = 1) | ASTM D3343 | — | — | — | 0.158 |
| Net Heating Value | ASTM D3338 | MJ/kg | — | — | 42.988 |
| Net Heating Value | ASTM D3338 | Btu/lb | — | — | 18479 |

TABLE 4

Specification of VW TDI engine

| Engine | VW TDI Common Rail |
|---|---|
| Manufacturer Engine ID | CFFB |
| Cylinder/Valves per cylinder | 4/4 (DOHC) |
| Displacement | 1.968 L |
| Maximum Power | 103 kW @ 4200 min$^{-1}$ |
| Maximum Torque | 320 Nm @ 1750-2500 min$^{-1}$ |
| Compression | 16.5:1 |
| Engine Management | Bosch EDC 17 |
| Emission Standard | Euro 5 |
| Injectors | Solenoid-operated |
| Air/emissions management | Single stage turbo with VGT and after-cooler, high pressure EGR, DOC and DPF |
| Installed in vehicle (example) | VW Passat, BlueMotion, 2.0 TDI |
| Fuel consumption (NEDC) | 119 g $CO_2$/km combined |

Results

The parameters of torque and peak cylinder pressure were measured for each of the fuel blends shown in Table 2. A statistically significant benefit was measured for Fuel Composition 1 and Fuel Composition 2 versus the diesel base fuel for all of these parameters.

The torque measurements are shown in Table 5 below. The percentage change over the base fuel is quoted to a 95% confidence level.

TABLE 5

| Example | P # | Engine Speed (rpm) | Dose Rate of copolymer (ppm) | Torque benefit over base fuel (%) |
|---|---|---|---|---|
| Diesel Base Fuel + 2000 ppm Shellsol A150 | — | 2000 | 0 | — |
| Fuel Composition 1 | P73 | 2000 | 84 | 0.277% |
| Fuel Composition 2 | P73 | 2000 | 120 | 0.318% |

The peak cylinder pressure measurements are shown in Table 6 below. The percentage change over the base fuel is quoted to a 95% confidence level.

TABLE 6

| Example | P # | Engine Speed (rpm) | Dose Rate of copolymer (ppm) | Peak Cylinder Pressure benefit over base fuel (%) |
|---|---|---|---|---|
| Diesel Base Fuel (+2000 ppm Shellsol A150) | — | 2000 | 0 | — |
| Fuel composition 1 | P73 | 2000 | 84 | 0.309% |
| Fuel composition 2 | P73 | 2000 | 120 | 0.341% |

The data in Table 5 and Table 6 show that, when used in a diesel fuel, the copolymer produced in Synthesis Example S7 provided a performance benefit. In particular, this data shows that the fuel compositions that incorporate the copolymer have improved combustion characteristics. The fuel compositions of the invention display improved power (torque) than the base fuel without the copolymer. In addition, the fuel compositions of the invention display improved peak cylinder pressure than the base fuel without the copolymer.

Diesel Vehicle Testing

The fuel blends shown in Table 7 were prepared for vehicle testing on a chassis dynamometer.

TABLE 7

| | | | Fuel blend composition |
|---|---|---|---|
| Example | Fuel/Fuel blend # | Copolymer # | Amount of copolymer (ppm) |
| Diesel Base Fuel (+additive package) | B5 diesel base fuel (5% biodiesel) + additive package | none | 0 |
| Fuel Composition 3 | B5 diesel base fuel + additive package | S9 (P75B) | 70 |

Fuel composition 3 was prepared by adding 70 ppm of the copolymer prepared in Synthesis Example S9 (P75B) to a diesel additive package (containing a detergent, anti-foam additive, an anti-corrosion additive and a solvent) and then dissolving the resulting mixture in a B5 diesel base fuel to yield a fuel composition having the desired mg/kg (ppm) concentration. The amount of copolymer present is indicated in ppm based on the total weight of the fuel composition. The diesel base fuel was a B5 diesel base fuel falling within the RF-06-08 specification shown above in Table 3 with the addition of a diesel additive package but no rheology-improving copolymer.

The diesel base fuel (including additive package) and fuel composition 3 were subjected to testing in a Euro-6 BMW320D, with DPF and Lean NOx-trap on a chassis dynamometer. The specification of the BMW vehicle is set out below in Table 8. Testing included wide open throttle (WOT) accelerations from 1200 rpm to 4300 rpm and WOT power tests from 1500 rpm to 4000 rpm in 500 rpm steps.

TABLE 8

Specification of BMW Vehicle

| Vehicle Model | kW/rpm | Gearbox |
|---|---|---|
| BMW 320d | 135/4000 | 6-speed, manual |

Results

The parameters of torque, acceleration and peak cylinder pressure were measured for each of the fuel blends shown in Table 7. A statistically significant benefit was measured for Fuel Composition 3 versus the diesel base fuel (with additive package) for all of these parameters.

The torque and peak pressure measurements are shown in Table 9 below. The improvement in acceleration from composition 4 versus composition 3 is in Table 10 below. The percentage change over fuel not containing S9 polymer is quoted to a 95% confidence level.

TABLE 9

| Engine Speed | Torque benefit of fuel composition 3 versus diesel base fuel (with additive package) | Increase in peak pressure of fuel composition 3 versus diesel base fuel (with additive package) |
|---|---|---|
| 2000 rpm | 0.231% | not significant |
| 2500 rpm | 0.336% | 0.147% |
| 3000 rpm | 0.385% | 0.256% |
| 3500 rpm | 0.418% | 0.303% |
| 4000 rpm | 0.288% | 0.293% |

TABLE 10

| Engine speed range | Improvement in acceleration of fuel composition 3 versus diesel base fuel with additive package |
|---|---|
| 1200-4000 rpm | 0.400% |

The data in Table 9 and Table 10 show that, when used in a diesel fuel, the copolymer produced in Synthesis Example S9 provided a performance benefit. In particular, this data shows that the fuel compositions that incorporate the copolymer have improved combustion characteristics. The fuel compositions of the invention display improved power (torque) and acceleration compared to the base fuel without the copolymer. In addition, the fuel compositions of the invention display improved peak cylinder pressure compared to the base fuel without the copolymer.

While not wishing to be limited by theory, it is believed that the improved performance benefits are because of a modified rheology due to the use of the copolymer in the fuel, which leads to an improved delivery and atomization of the fuel and a more complete combustion.

That which is claimed is:

1. A fuel composition for powering a combustion engine, the composition comprising:
    a liquid base fuel; and
    a copolymer formed by copolymerizing monomers, the monomers comprising at least the following:
        (a) one or more bicyclic methacrylate esters,
        (b) a styrene at a concentration ranging from 0 wt. % to 15 wt. %, and
        (c) other ethylenically unsaturated monomers,
    wherein the weight percentages of the monomers are based on the total weight of all the monomers, and
    wherein the copolymer has a weight averaged molecular weight of from above 2,000,000 Dalton to 50,000,000 Dalton.

2. The fuel composition according to claim 1, wherein the bicyclic methacrylate is according to formula I:

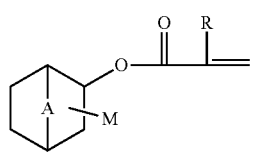

(I)

wherein
R is selected from the group consisting of H and —CH$_3$,
A is selected from the group consisting of —CH$_2$—, —CH(CH$_3$)—, and —C(CH$_3$)$_2$—, and
M is covalently bonded to a carbon atom of the six-membered ring and is selected from the group consisting of hydrogen and a methyl group or a plurality thereof.

3. The fuel composition according to claim 1, wherein the copolymer is a random copolymer.

4. The fuel composition according to claim 1, wherein one or more of:
    the bicyclic methacrylate ester is present at a concentration ranging from 60 wt. % to 99.95 wt. %,
    the styrene is present at a concentration ranging from 0.05 wt. % to 15 wt. %, and
    the ethylenically unsaturated monomers are present at a concentration ranging from 0 wt. % to 25 wt. %.

5. The fuel composition according to claim 1, wherein one or more of:
    the bicyclic methacrylate ester is present at a concentration ranging from 85 wt. % to 99.95 wt. %,
    the styrene is present at a concentration ranging from 1 wt. % to 10 wt. %, and
    the ethylenically unsaturated monomers are present at a concentration ranging from 0 wt. % to 10 wt. %.

6. The fuel composition according to claim 1, wherein one or more of:
    the bicyclic methacrylate ester is present at a concentration ranging from 90 wt. % to 99.95 wt. %,
    the styrene is present at a concentration ranging from 2 wt. % to 8 wt. %, and
    the ethylenically unsaturated monomers are present at a concentration ranging from 0 wt. % to 5 wt. %.

7. The fuel composition according to claim 1, wherein the copolymer comprises a total of bicyclic methacrylate ester and styrene in an amount of 80 wt % or more.

8. The fuel composition according to claim 1, wherein the copolymer comprises a total of bicyclic methacrylate ester and styrene in an amount of 95 wt % or more.

9. The fuel composition according to claim 1, wherein the copolymer is produced from isobornyl methacrylate and styrene.

10. The fuel composition according to claim 1, wherein the copolymer has a cloud point in fuel of 12.5° C. or lower.

11. The fuel composition according to claim 1, wherein the base fuel is a diesel base fuel and the fuel composition is a diesel fuel composition.

12. The fuel composition according to claim 1, wherein the amount of copolymer present in the fuel composition is in the range of from 10 ppm to 300 ppm, by weight of the fuel composition.

13. The method of blending a fuel composition according to claim 1, the method comprising blending one of the copolymer and an additive package containing the copolymer with the base fuel.

* * * * *